US010496516B2

(12) United States Patent
Ham et al.

(10) Patent No.: US 10,496,516 B2
(45) Date of Patent: Dec. 3, 2019

(54) SOURCE CODE ANALYSIS DEVICE, COMPUTER PROGRAM FOR SAME, AND RECORDING MEDIUM THEREOF

(71) Applicant: FASOO. COM CO., LTD, Seoul (KR)

(72) Inventors: Hyungkil Ham, Seoul (KR); Yungbum Jung, Incheon (KR)

(73) Assignee: SPARROW CO., LTD., Seoul (KR)

( * ) Notice: Subject to any disclaimer, the term of this patent is extended or adjusted under 35 U.S.C. 154(b) by 260 days.

(21) Appl. No.: 15/505,669

(22) PCT Filed: Aug. 26, 2015

(86) PCT No.: PCT/KR2015/008937
§ 371 (c)(1),
(2) Date: Feb. 22, 2017

(87) PCT Pub. No.: WO2016/032234
PCT Pub. Date: Mar. 3, 2016

(65) Prior Publication Data
US 2017/0277617 A1 Sep. 28, 2017

(30) Foreign Application Priority Data

Aug. 27, 2014 (KR) .................. 10-2014-0112583
Oct. 2, 2014 (KR) .................. 10-2014-0133347

(51) Int. Cl.
*G06F 9/44* (2018.01)
*G06F 11/36* (2006.01)
(Continued)

(52) U.S. Cl.
CPC ............ *G06F 11/3604* (2013.01); *G06F 8/33* (2013.01); *G06F 8/42* (2013.01)

(58) Field of Classification Search
CPC .................................. G06F 11/3604
(Continued)

(56) References Cited

U.S. PATENT DOCUMENTS 4,931,928 A * 6/1990 Greenfeld ............... G06F 8/427
707/999.003
4,989,145 A * 1/1991 Kyushima ............... G06F 8/427
704/9
(Continued)

FOREIGN PATENT DOCUMENTS

CN 101286132 A * 10/2008
CN 101499015 8/2009
(Continued)

OTHER PUBLICATIONS

International Search Report for PCT/KR2015/008937 dated Dec. 18, 2015, Korean Intellectual Property Office.
(Continued)

*Primary Examiner* — Evral E Bodden
(74) *Attorney, Agent, or Firm* — Lex IP Meister, PLLC

(57) ABSTRACT

The present invention relates to a source code analysis device, a computer program for the same, and a recording medium thereof. Disclosed is a source code analysis device including: a source code analysis module including: a syntax analysis unit for extracting and refining information required for analysis; a defect detection unit for detecting defect information; a correction example generation unit for generating correction example information or notice information or both; and an analysis result transmission unit for constructing synthesized analysis result information and transmitting the constructed information to an analysis result output module, and the analysis result output module including: a defect output unit for extracting and outputting the defect information from the synthesized analysis result information, and a correction example output unit for extracting and outputting the correction example information and or notice information or both from the synthesized analysis result information.

2 Claims, 7 Drawing Sheets

(51) Int. Cl.
*G06F 8/33* (2018.01)
*G06F 8/41* (2018.01)

(58) Field of Classification Search
USPC .......................................................... 717/143
See application file for complete search history.

(56) References Cited

U.S. PATENT DOCUMENTS

| | | | |
|---|---|---|---|
| 8,752,009 B2* | 6/2014 | Nomura | G06F 8/71 717/110 |
| 2017/0212829 A1* | 7/2017 | Bales | G06F 11/3664 |

FOREIGN PATENT DOCUMENTS

| | | |
|---|---|---|
| JP | 2010-97426 | 4/2010 |
| JP | 2011-129121 | 6/2011 |
| JP | 2012-103923 | 5/2012 |
| KR | 10-2001-0011036 | 2/2001 |
| KR | 10-0501936 | 7/2005 |
| KR | 10-2011-0020520 | 3/2011 |
| KR | 10-1051600 | 7/2011 |
| WO | 2009-011056 | 1/2009 |

OTHER PUBLICATIONS

Office Action dated Nov. 20, 2015 for Application No. 10-2014-0133347, Korean Intellectual Property Office.
SIPO, The First Office Action of CN 201580046317.1 dated Jan. 30, 2019.
Kosuke Kawaguchi, "improvement of work in team", Web+DB Press, Technical Hyoronsha, vol. 67, pp. 16-21, Mar. 25, 2012.
Tomomi Murakami, "production of foundation of team development", Web+DB Press, Technical Hyoronsha, vol. 43, pp. 68-72 (Document showing a well-known technique), Mar. 25, 2008.
JPO, Notification of Reasons for Refusal of JP 2017-510645 dated Feb. 6, 2018.
Machida, "tool practical use way (1) static-analyses tool which supports test automation", software test Press, Technical Hyoronsha, vol. 3, pp. 46-53, Aug. 25, 2006.
JPO, Notification of Reasons for Refusal of JP 2017-510645 dated Jan. 8, 2019.
SIPO, The Second Office Action of CN 201580046317.1 dated Sep. 20, 2019.

* cited by examiner

[FIG. 1]
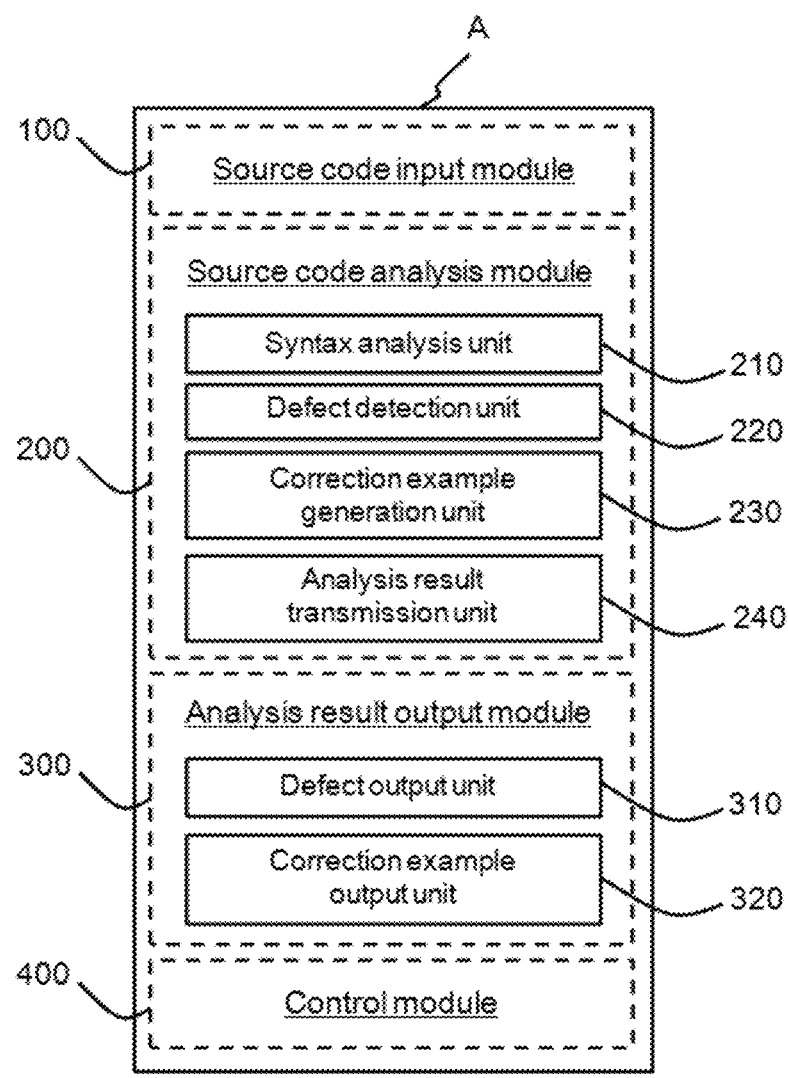

[FIG. 2]
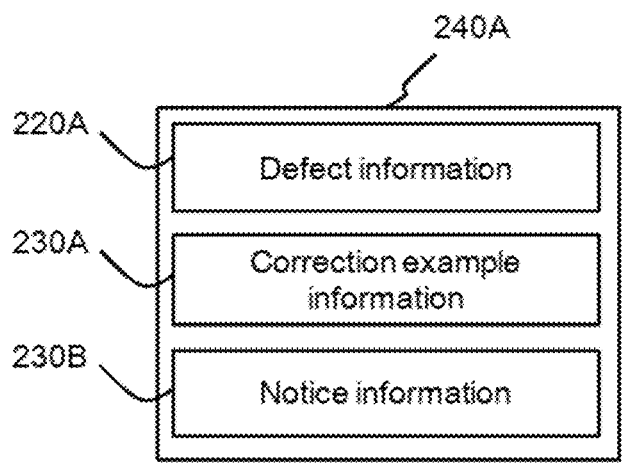
[FIG. 3]

[FIG. 4]
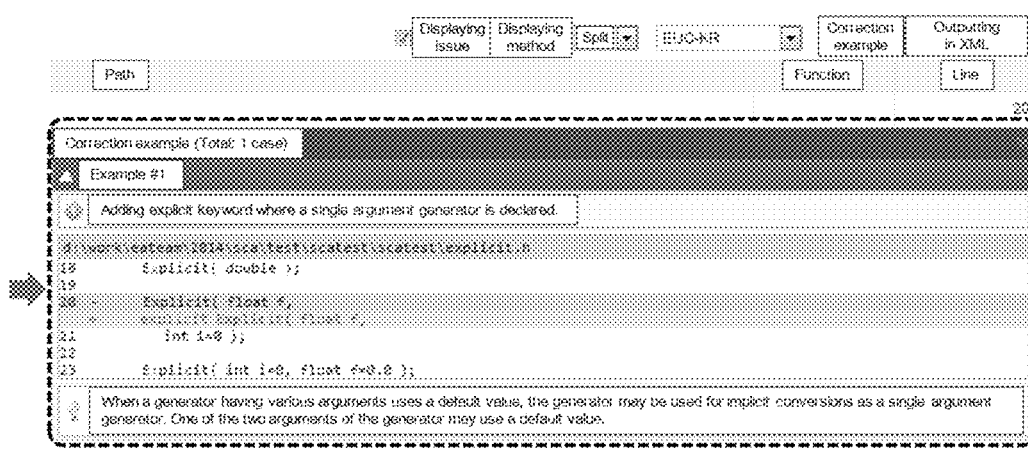
[FIG. 5]
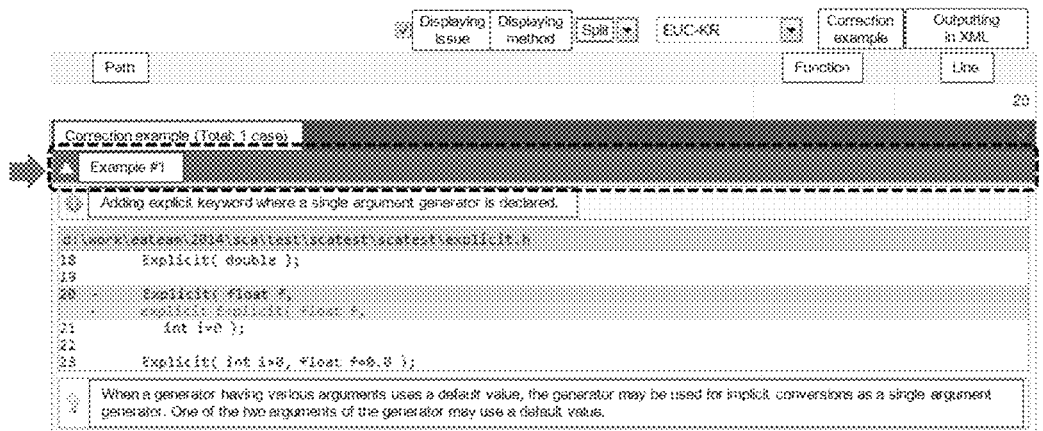

[FIG. 6]
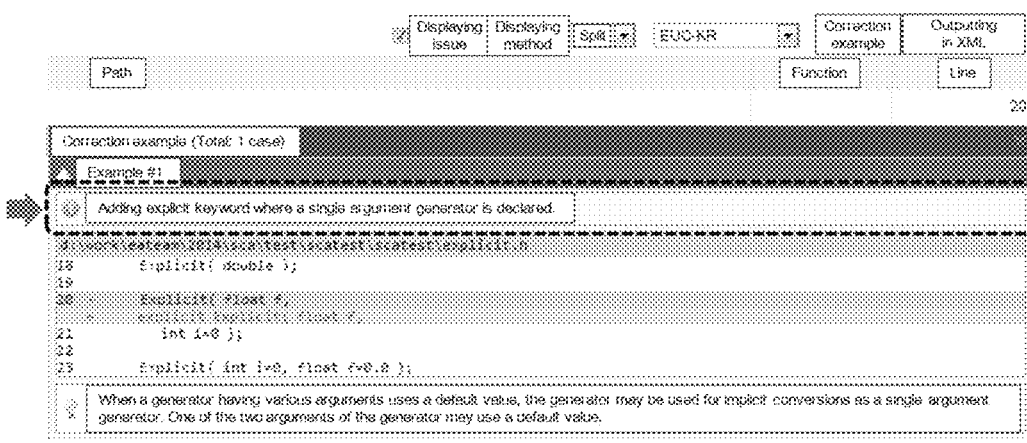
[FIG. 7]
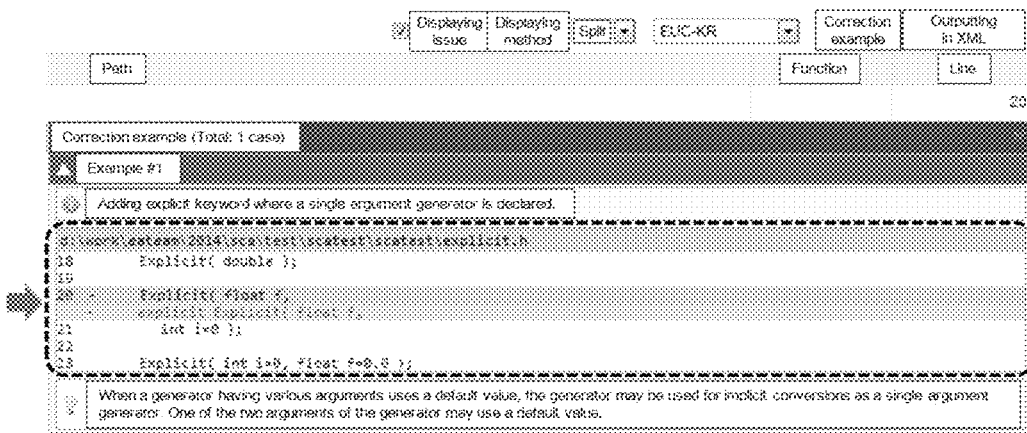

[FIG. 8]
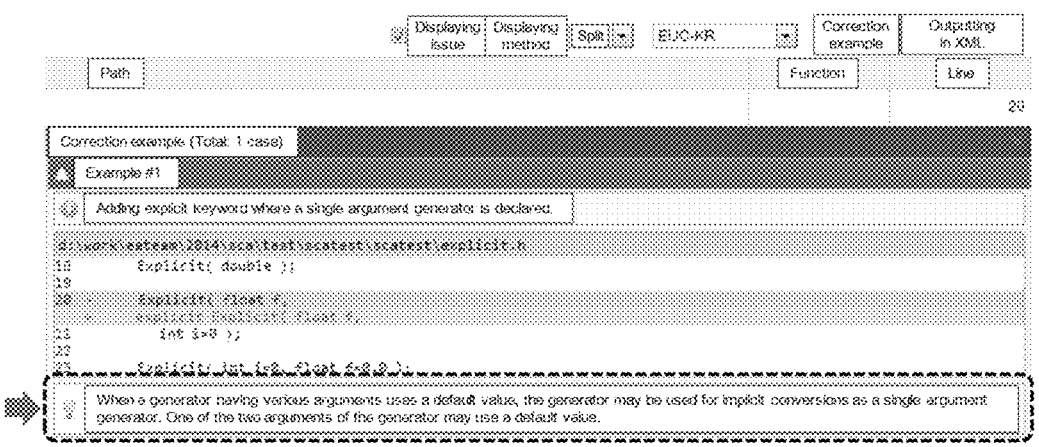

[FIG. 9]
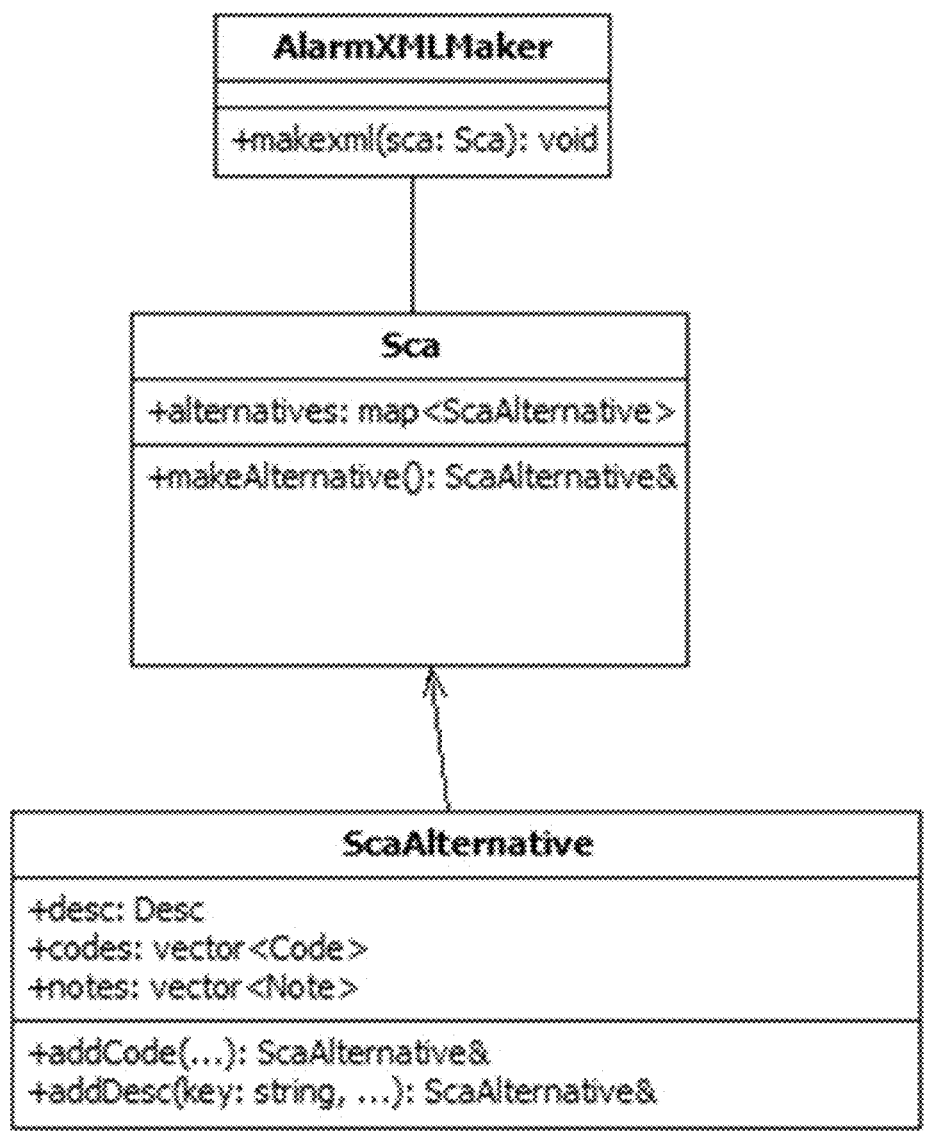

[FIG. 10]
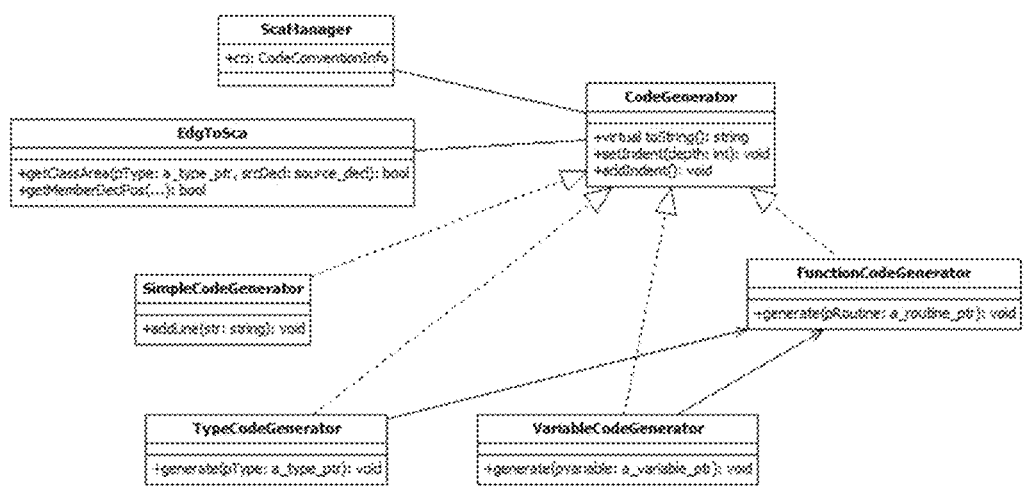

SOURCE CODE ANALYSIS DEVICE, COMPUTER PROGRAM FOR SAME, AND RECORDING MEDIUM THEREOF

TECHNICAL FIELD

The present invention relates to a source code analysis device, a computer program for the same, and a recording medium thereof that are configured to suggest a defect correction example when a defect is detected in an analysis target source code according to a predefined analysis rule.

BACKGROUND ART

Static code analysis is one of various methods for analyzing computer software. This method performs code analysis on source code of software under development without directly executing the software Static analysis tools are programs developed to automatically perform static program analysis using software rather than by humans. In general, the size of source code is very large, and it is almost impossible to manually perform static program. Therefore, it is the role of the static analysis tool to automate and perform these analyses. Static analysis tools may detect various kinds of defects or vulnerabilities in the source code according to the type, and inform a user of the detected defects by analyzing the source code.

Conventionally, source code analysis apparatuses using static analysis tools described above have been variously provided.

However, source code analysis apparatuses that are conventionally provided and used provide only a defect detection function and generate a detection message thereof. There is a limit that a correction of the detected defect depends on personal knowledge and experience of a user (programmer).

DISCLOSURE

Technical Problem

Accordingly, the present invention has been made keeping in mind the above problems occurring in the prior art, and an object of the present invention is to provide a source code analysis device, a computer program for the same, and a recording medium thereof that are configured to suggest a defect correction example when a defect is detected in an analysis target source code according to a predefined analysis rule.

Technical Solution

In order to accomplish the above object, according to one aspect of the present invention, there is provided a source code analysis device including: a source code analysis module including: a syntax analysis unit for extracting information required for analysis from a source code and refining the extracted information; a defect detection unit for detecting defect information that may cause a problem in the source code based on the information that is required for analysis and refined by the syntax analysis unit; a correction example generation unit for generating correction example information or notice information or both based on the defect information detected by the defect detection unit and the information that is required for analysis and refined by the syntax analysis unit; and an analysis result transmission unit for constructing synthesized analysis result information including the generated defect information, and the correction example information or the notice information or both and transmitting the constructed synthesized analysis result information to an analysis result output module, and the analysis result output module including: a defect output unit for extracting the defect information from the synthesized analysis result information received from the source code analysis module and outputting the extracted defect information; and a correction example output unit for extracting the correction example information or the notice information or both from the synthesized analysis result information received from the source code analysis module and outputting the extracted information.

The correction example generation unit may be configured to generate one or more pieces of correction example information or one or more pieces of notice information for single defect information.

The detection of the defect information by the defect detection unit may be performed by a functional execution of each checker that is provided so as to check each defect, and each checker may transmit the synthesized analysis result information that includes the correction example information or the notice information or both to be generated for the defect information detected while detecting the defect information to the correction example generation unit.

The correction example information may include at least one of "adding" another code line for a source code line in which the defect information is detected, "replacing" a source code line in which the defect information is detected with another source code line, and "deleting" a source code line in which the defect information is detected.

The correction example information may include a correction example code, the correction example code being generated by inputting a deduced result that is obtained by analyzing the source code according to a predetermined template by the checker that has detected the defect information.

According to another aspect of the present invention, there is provided a computer program stored in a medium and configured to perform: a source code analysis function and an analysis result output function in a source code analysis device, wherein the source code analysis function includes: a syntax analysis function for extracting information required for analysis from a source code and refining the extracted information; a defect detection function for detecting defect information that may cause a problem in the source code based on the information that is required for analysis and refined by the syntax analysis function; a correction example generation function for generating correction example information or notice information or both based on the defect information detected by the defect detection function and the information that is required for analysis and refined by the syntax analysis function; and an analysis result transmission function for constructing synthesized analysis result information including the generated defect information, and the correction example information or the notice information or both and transmitting the constructed synthesized analysis result information to an analysis result output function, and the analysis result output function includes: a defect output function for extracting the defect information from the synthesized analysis result information received from the source code analysis function and outputting the extracted defect information; and a correction example output function for extracting the correction example information or the notice information or both from the synthesized analysis result information received from the source code analysis function and outputting the extracted information.

According to another aspect of the present invention, there is provided a computer readable recording medium, whereby a computer program configured to perform a source code analysis function and an analysis result output function by a source code analysis device is recorded, wherein the source code analysis function includes: a syntax analysis function for extracting information required for analysis from a source code and refining the extracted information; a defect detection function for detecting defect information that may cause a problem in the source code based on the information that is required for analysis and refined by the syntax analysis function; a correction example generation function for generating correction example information or notice information or both based on the defect information detected by the defect detection function and the information that is required for analysis and refined by the syntax analysis function; and an analysis result transmission function for constructing synthesized analysis result information including the generated defect information, and the correction example information or the notice information or both, and transmitting the constructed synthesized analysis result information to an analysis result output function, and the analysis result output function includes: a defect output function for extracting the defect information from the synthesized analysis result information received from the source code analysis function and outputting the extracted defect information; and a correction example output function for extracting the correction example information or the notice information or both from the synthesized analysis result information received from the source code analysis function and outputting the extracted.

Advantageous Effects

As described above, the present invention is configured to suggest a defect correction example when a defect is detected in an analysis target source code according to a predefined analysis rule, thus the defect may be corrected in a more objective and improved way and without depending on the personnel knowledge and experience of a user (programmer).

DESCRIPTION OF DRAWINGS

FIG. 1 is a configuration diagram of a source code analysis device according to an embodiment of the present invention.

FIG. 2 is an example configuration of analysis result information of the source code analysis device according to the embodiment of the present invention.

FIG. 3 is a source code screen example in which a defect is detected by a checker of a defect detection unit of the source code analysis device according to the embodiment of the present invention.

FIG. 4 is an output screen example of synthesized analysis result after clicking a correction example button of the source code analysis device according to the embodiment of the present invention.

FIG. 5 is an example menu display example of the output screen of the synthesized analysis result after clicking the correction example button of the source code analysis device according to the embodiment of the present invention.

FIG. 6 is a defect information display example of the output screen of the synthesized analysis result after clicking the correction example button of the source code analysis device according to the embodiment of the present invention.

FIG. 7 is a correction example information display example of the output screen of the synthesized analysis result after clicking the correction example button of the source code analysis device according to the embodiment of the present invention.

FIG. 8 is a notice information display example of the output screen of the synthesized analysis result after clicking the correction example button of the source code analysis device according to the embodiment of the present invention.

FIG. 9 is an XML output class example of a checker implementation class for the source code analysis device according to the embodiment of the present invention.

FIG. 10 is a code generation class example of the checker implementation class for the source code analysis device according to the embodiment of the present invention.

MODE FOR INVENTION

Before the present invention is described in detail, it should be noted that the present invention may be embodied in many different forms without departing from the spirit and significant characteristics of the present invention. Therefore, the embodiments of the present invention are disclosed only for illustrative purposes and should not be construed as limiting the present invention.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element. The term "and/or" includes any and all combinations of one or more of the associated listed items.

It should be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Terms used herein are used only in order to describe specific embodiments rather than limiting the present invention. As used herein, the singular forms are intended to include the plural forms as well, unless the context clearly indicates otherwise. It will be further understood that the terms "comprises" or "have" used in this specification, specify the presence of stated features, processes, operations, components, parts, or a combination thereof, but do not preclude the presence or addition of one or more other features, numerals, processes, operations, components, parts, or a combination thereof.

Unless otherwise defined, all terms including technical and scientific terms used herein have the same meaning as commonly understood by one of ordinary skill in the art to which the present invention belongs. It should be understood that the terms defined by the dictionary are identical with the meanings within the context of the related art, and they should not be ideally or excessively formally defined unless the context clearly dictates otherwise in this specification.

Hereinafter, exemplary embodiments of the invention will be described in detail with reference to the accompanying drawings. The same or corresponding elements will be consistently denoted by the same respective reference numerals and described in detail no more than once regardless of drawing symbols. When the functions of conventional elements and the detailed description of elements related with the present invention may make the gist of the present invention unclear, a detailed description of those elements will be omitted.

FIG. 1 is a configuration diagram of a source code analysis device according to an embodiment of the present invention and FIG. 2 is an example configuration of analysis result information of the source code analysis device according to the embodiment of the present invention.

The source code analysis device A according to the embodiment of the present invention may include a source code input module 100, a source code analysis module 200, an analysis result output module 300, and a control module 400. In one embodiment, a computer program for implementing the source code analysis device may be implemented to be operated in conventional computer hardware.

The source code input module 100, for example, may receive an analysis target source code in a code file format so that the source code analysis module 200 that will be described later may perform an analysis process. For example, the code file may be input by inputting a file or by opening the file through a user.

The source code analysis module 200 generates synthesized analysis result information 240A including defect information 220A, correction example information 230A and various types of notice information 230B that may be generated while correcting the defect from the source code received for analysis.

The analysis result output module 300 displays the defect information 220A, the correction example information 230A and the notice information 230B to a user based on the synthesized analysis result information 240A received from the source code analysis module 200. According to an embodiment, the source code analysis module 200 and the analysis result output module 300 may be implemented in a single integrated module.

In the preferred embodiment, the source code analysis module 200 includes a syntax analysis unit 210, a defect detection unit 220, a correction example generation unit 230, and an analysis result transmission unit 240.

The syntax analysis unit 210 extracts various types of information required for analysis from the received source code and refines the extracted information. The information required for analysis may be, for example, an abstract syntax tree, or a number of lines, positional information of the source code, etc.

The defect detection unit 220 detects the defect information 220A that may cause a problem in the source code based on the information that is required for analysis and refined by the syntax analysis unit 210. The defect detection unit 220 may detect the defect information 220A by executing, for example, a function of a checker that checks whether or not the source code includes a defect. The defect information 220A, for example, may be configured with a file name of the source code in which a defect is actually detected, a defect type and positional information such as a line, a part of the source code that actually has caused the defect, actual defect information such as a flow of the source code where the defect has occurred, etc.

The syntax analysis function of the syntax analysis unit 210 and the defect detection function of the defect detection unit 220 may be implemented through the same configuration or similar configuration that implements functions of a syntactic analysis and of a defect information detection by using various well-known static analysis tools. The static analysis tool is well known through various commercial product with analysis methods that are based on a syntactic base or on a semantic base, thus the detailed description thereof is omitted.

The defect detection unit 220 may detect the defect information 220A by executing functions of respective checkers configured to respectively check a defect. The respective checkers are configured to transmit the synthesized analysis result information 240A including the correction example information 230A and the notice information 230B generated for the defect information 220A detected while detecting the defect information 220A to the correction example generation unit 230. The synthesized analysis result information 240A may be configured, for example, with a correction example XML file format, but it is not limited thereto.

Meanwhile, although a single checker is used, different correction example information 230A and notice information 230B may be transmitted to the correction example generation unit 230 according to a structure of the analyzed source code. In addition, when there is no need to provide the correction example information 230A and the notice information 230B, the checker may not provide the correction example information 230A and the notice information 230B according to a characteristic of the defect, or may provide only the correction example information 230A, or the notice information 230B. In addition, multiple pieces of correction example information 230A and notice information 230B may be generated for single defect information 220A as multiple alternatives, and this will be separately described later. In the description of the present embodiment, the correction example information 230A and the notice information 230B are provided together.

The correction example generation unit 230 generates the correction example information 230A and the notice information 230B based on the defect information 220A detected by the defect detection unit 220 and the information required for analysis and refined by the syntax analysis unit 210.

The correction example information 230A refers to a correction example code that indicates how to actually correct the source code within the defect information 220A in which the defect is generated. For example, the defect does not occur when the source code is corrected based on the given correction example information 230A.

The correction example information 230A may include at least one of "adding" another code line for a source code line in which the defect information 220A is detected, "replacing" a source code line in which the defect information 220A is detected with another source code line, and "deleting" a source code line in which the defect information 220A is detected.

The notice information 230B refers to various pieces of notice information that may be generated while the user corrects the source code. For example, the notice information 230B may be useful information while the user corrects the source code, additional problems that may be generated by correcting the source code according to the given correction example information 230A, or a modification that the user has to directly correct since the modification cannot be automatically generated by the source code analysis device A.

The analysis result transmission unit 240 constitutes the synthesized analysis result information 240A with the defect information 220A, the correction example information 230A, and the notice information 230B that are generated above and transmits the constituted synthesized analysis result information to the analysis result output module 300. The synthesized analysis result information 240A may be data within a file or a memory, or may include other information. In addition, the correction example information 230A and the notice information 230B may not be provided or may be provided in multiple pieces for single defect information 220A according to a defect type.

In the preferred embodiment, the analysis result output module 300 includes a defect output unit 310 and a correction example output unit 320.

The defect output unit 310 extracts the defect information 220A from the synthesized analysis result information 240A transmitted from the source code analysis module 200 and displays the extracted defect information 220A. Generally, as described above, the defect information 220A may be a file name of the source code in which the defect is actually detected, a defect type and positional information such as a line, a part of the source code that actually has caused the defect, actual defect information such as a flow of the source code where the defect has occurred, etc.

The correction example output unit 320 extracts the correction example information 230A and the notice information 230B from the synthesized analysis result information 240A transmitted from the source code analysis module 200, and displays the extracted correction example information 230A and the notice information 230B. Generally, the information may be, as described above, a correction example code that shows how to actually correct the source code, and various pieces of notice information that may be generated while the user corrects the source code. According to an embodiment, the defect output unit 310 and the correction example output unit 320 may output information at the same time or may output additional information.

Hereinafter, an implementation example of the source code analysis device according to the embodiment of the present invention is described with reference to respective example screens.

FIG. 3 is a source code screen example in which a defect is detected by a checker of a defect detection unit of the source code analysis device according to the embodiment of the present invention.

When a defect is detected, a correction example button is displayed on a right-upper part of the screen.

FIG. 4 is an output screen example of synthesized analysis result after clicking a correction example button of the source code analysis device according to the embodiment of the present invention.

Defect information, correction example information, and notice information are respectively displayed on the screen. One or more pieces of correction example information or one or more pieces of notice information may be provided for single defect information.

FIG. 5 is an example menu display example of the output screen of the synthesized analysis result after clicking the correction example button of the source code analysis device according to the embodiment of the present invention.

A number of the example menus may be varied according to a checker type and the source code. Each of the example menus may be folded or extended by clicking a triangle mark disposed at a left-most part of the example menu.

FIG. 6 is a defect information display example of the output screen of the synthesized analysis result after clicking the correction example button of the source code analysis device according to the embodiment of the present invention.

A defect information menu indicates how to correct the defect detected by the checker.

FIG. 7 is a correction example information display example of the output screen of the synthesized analysis result after clicking the correction example button of the source code analysis device according to the embodiment of the present invention.

The correction example menu shows which part of the source code and how to correct the source code. The example code is provided as similar as possible to an actual code. A Line that is gradated in red on the screen and begins with '−' corresponds to a code to be deleted. A Line that is gradated in green on the screen and begins with '+' corresponds to a code to be added. When lines of codes to be corrected are too far away from each other or are positioned in different files, multiple boxes may be displayed.

FIG. 8 is a notice information display example of the output screen of the synthesized analysis result after clicking the correction example button of the source code analysis device according to the embodiment of the present invention.

The notice information shows various situations and cautions that may arise when the source code is corrected. Therefore, a number of pieces of the notice information and contents thereof may vary according to a checker type and the source code.

The below source code is an example of a correction example XML file of the source code analysis device according to the embodiment of the present invention. Table 1 shows an example of a main tag or variable definitions of the correction example XML file of the below source code. An example of the correction example XML file of the present embodiment may be understood by the below source code and Table 1.

```
<alarm>
    <sca>
    <alternative id="1">
    <desc id="crulechk.CHECKER_NAME.sca.desc.default">
        <arg>func</arg>
    </desc>
    <code type="add" src="/src/somefile.cpp" startline="1230">
        strncpy(dst, src, 10);
    </code>
    <code type="remove" src="/src/somefile.cpp" startline="1250" endline="1251"/>
    <code type="replace" src="/src/somefile.cpp" startline="1400">void func(int arg) </code>
    <note type="change_function_interface">
    <desc id="crulechk.CHECKER_NAME.sca.note.desc.1">
        <arg>func</arg>
    </desc>
    <value type="def_src">/src/somefile.cpp</value>
    <value type ="def_line">1250</value>
    <value type ="function_name">func</value>
    </note>
    </alternative>
    <alternative id="2">
    ...
    </alternative>
    </sca>
</alarm>
```

TABLE 1

| | |
|---|---|
| alarm | Represent the top defect element |
| sca | SCA top defect element |
| alternative | Element covering each one alternative |
| desc | Represent description element of alternative (=resource property) |
| arg | Represent argument value of alternative description element of alternative. |
| code | Represent element of code to be changed |
| note | Represent notice element |
| (note)desc | Represent description element of notice (=resource property) |
| (note)arg | Represent argument value of explanation element of notice |
| value | Represent element value to be changed in notice |

'sca' or 'Sca' is an abbreviation of 'Smart Code Alternative', and is named as an example name of a parent element including multiple alternatives included in the correction example XML file of the present embodiment for convenience.

FIG. 9 is an XML output class example of a checker implementation class for the source code analysis device according to the embodiment of the present invention, and FIG. 10 is a code generation class example of the checker implementation class for the source code analysis device according to the embodiment of the present invention.

FIG. 9 briefly shows class examples from the top class.

The top 'AlarmXMLMaker' class outputs an alarm with a Sca instance when the Sca instance is present.

A middle 'Sca' class is responsible for generating a ScaAlternative instance, and the present class is used in the checker when generating the alternative.

The lowest 'ScaAlternative' class (alternative information class) includes an explanation, a code, and notice information. Information about adding/replacing/deleting of a code may be obtained by receiving code information generated by 'CodeGenerator' class or received from an original source code.

In FIG. 10, 'CodeGenerator' class (code generation class) generates a correction example code by using a deduced result, which is obtained by analyzing the source code according to a predetermined template, as an input value. CodeGenerator' class includes 'SimpleCodeGenerator' for adding a line, 'TypeCodeGenerator' for generating a type, 'VariableCodeGenerator' for generating a variable, and 'FunctionCodeGenerator' for generating a function, etc.

Table 2 shows a configuration example of the checker for the source code analysis device according to the embodiment of the present invention, Table 3 shows another configuration example of the checker for the source code analysis device according to the embodiment of the present invention, and Table 4 shows another configuration example of the checker for the source code analysis device according to the embodiment of the present invention.

TABLE 2

| | | Example 1 | |
|---|---|---|---|
| | Checker | DO_NOT_USE_ADJACENT_BINARY_OPERATOR | |
| | Source code | [1] strncpy(dst, src, sizeof(dst) — 1); | |
| Alternative 1 | Description | — adding blank between operators. | |
| | Alternative type | REPLACE | |

TABLE 2-continued

| | | Example 1 | |
|---|---|---|---|
| | Alternative code | [1] strncpy(dst, src, sizeof(dst) — 1); | |
| | Notice | none | |

In case of example 1, a checker checks in that binary operators except for a dot (.) operands and forward/backward operators are separated by a space. Inputting spaces in the left and the right parts where a binary operator '−' is used may generate an alternative code (correction example code). In case of the present example, there is no special notice.

TABLE 3

| | | Example 2 |
|---|---|---|
| | Checker | DO_NOT_USE_SIZEOF_ON_ARRAY_PARAM |
| | Source code | [1] void func(char dst[ ], char src[ ])<br>[2] {<br>[3] strncpy(dst, src, sizeof(dst)— 1);<br>[4] } |
| Alternative 1 | Description | Changing function interface and using third argument of strncpy as received value |
| | Alternative type | REPLACE |
| | Alternative code | [1] void func(char dst[ ], int<<length identifier>>, char src[ ]) |
| | Notice | [changing function interface] need to correct declaration part of func function and codes using thereof |
| | Alternative type | REPLACE |
| | Alternative code | [3] strncpy(dst, src, <<length_identifier>>); |
| | Notice | none |

In case of example 2, a checker checks in that "sizeof" cannot be used for an array type variable that is received as an array type parameter. Alternative codes are generated in lines [1] and [3]. Herein, a function interface changing notice occurs due to a correction of a line [1]. When the function interface is changed, a function declaration and a part using the function may also be corrected. In "strncpy" of line [3], a length value variable added in the Alternative 1 is put into a start phrase of a third argument. There is no particular notice in the case.

TABLE 4

| | | Example 3 |
|---|---|---|
| | Checker | NONEFFECTIVE_FUNCTION_CALL |
| | Source code | [1] char * buf= (char *)malloc(sizeof(char) * ((1 * 2) + 1));<br>[2] memset(buf, (1 * 2) + 1, 0); // Initialize the buffer |
| Alternative 1 | Description | Replacing third argument of memset with buffer size |
| | Alternative type | REPLACE |
| | Alternative code | [2] memset(buf, (1 * 2) + 1, sizeof(char) * ((1 * 2) + 1)); |
| | Notice | pone |

TABLE 4-continued

Example 3

| | | |
|---|---|---|
| Alternative 2 | Description | Changing second argument of memset and third argument thereof with each. other since second argument thereof is not a constant. Position of the argument may be confused. |
| | Condition | When second argument of memset is not a single constant. |
| | Alternative type | REPLACE |
| | Alternative code | [3] memset(buf, 0, (1 * 2) + 1); |
| | Notice | none |

In case of example 3, a checker checks a function call that has no effect. For example, when a third argument (parameter) value in memset is 0, the corresponding code becomes meaningless. Alternative 1 displays a buffer size of a buffer to be initialized if it is possible to deduce. If not, Alternative 1 displays the buffer size by using a designated identifier such as <<length>>, etc. Alternative 2 is an alternative that is conditionally generated. When a second argument of memset is not a single constant, there is a possibility that second and third argument values may be used by being switched with each other. Therefore, Alternative 2 suggests switching the second and third argument values with each other. The checker of the example 3 does not include any particular notice.

In one embodiment, the alternative of the respective checkers shown in Tables 2 to 4 may be provided by 'Sca' class and 'ScaAlternative' class (alternative information class) shown in the above FIG. 9.

In another embodiment, the alternative code of the respective checkers shown in Tables 2 to 4 may be provided by 'CodeGenerator' class (code generation class) shown in the above FIG. 10.

'Sca' class, 'ScaAlternative' class (alternative information class), and 'CodeGenerator' class (code generation class) may be preset in accordance with content of the defect of each checker.

Embodiments of the present invention include a program for performing various computer-implemented operations and a computer-readable storage medium on which the program is recorded. The computer-readable storage medium may include stand-alone or a combination of program instructions, data files and data structures. The computer-readable storage medium may be specially designed and configured for the present invention, or may also be known and available to those skilled in the computer software field. Examples of the computer-readable storage medium include a magnetic medium, such as a hard disk, a floppy disk, and a magnetic tape; an optical medium, such as a CD-ROM, a DVD, a USB; a magneto-optical medium such as a floptical disk; and a hardware device configured to store and perform program instructions such as a ROM, a RAM, a flash memory, etc. Examples of the program instructions include not only machine language codes made by a compiler but also high-level language codes executable by a device for electronically processing information, such as computer, by using an interpreter.

In one embodiment, the source code analyzing device of the present invention may be implemented in such a manner that a functional operation of a computer is executed by a computer program for executing a source code analysis function and an analysis result output function.

The source code analysis function is provided by the source code analysis module that is described above, and the analysis result output function is provided by the analysis result output module that is described above.

The source code analysis function further performs the detailed functions of the source code analysis module, and the analysis result output function further performs the detailed functions of the analysis result output module, thus the whole function of the source code analysis device may be provided.

The invention claimed is:

1. A source code analysis device comprising:
a source code analysis module including:
  a syntax analysis unit for extracting information required for analysis from a source code being input in a code file format and refining the extracted information;
  a defect detection unit for detecting defect information that may cause a problem in the source code based on the information that is required for analysis and refined by the syntax analysis unit, wherein the defect information is configured with positional information of a line in which a defect is detected;
  a correction example generation unit for generating correction example information or notice information or both based on the defect information detected by the defect detection unit and the information that is required for analysis and refined by the syntax analysis unit and being configured to generate one or more pieces of correction example information or one or more pieces of notice information for single defect information; and
  an analysis result transmission unit for constructing synthesized analysis result information including the generated defect information, and the correction example information or the notice information or both and transmitting the constructed synthesized analysis result information to an analysis result output module, and
the analysis result output module including:
  a defect output unit for extracting the defect information from the synthesized analysis result information received from the source code analysis module and outputting the extracted defect information; and
  a correction example output unit for extracting the correction example information or the notice information or both from the synthesized analysis result information received from the source code analysis module and outputting the extracted information,
wherein the detection of the defect information by the defect detection unit is performed by a functional execution of each checker that is provided so as to check each defect, and each checker transmits the synthesized analysis result information that includes the correction example information or the notice information or both to be generated for the defect information detected while detecting the defect information to the correction example generation unit,
wherein the correction example information includes at least one of "adding" another source code line for a source code line in which the defect information is detected, "replacing" a source code line in which the defect information is detected with another source code line, and "deleting" a source code line in which the defect information is detected, and
wherein the correction example information includes a correction example code, the correction example code being generated by inputting a deduced result that is obtained by analyzing the source code according to a predetermined template by the checker that has detected the defect information.

2. A non-transitory type computer readable recording medium, whereby a computer program configured to perform a source code analysis function and an analysis result output function by a source code analysis device is recorded,
wherein the source code analysis function includes:
   a syntax analysis function for extracting information required for analysis from a source code being input in a code file format and refining the extracted information;
   a defect detection function for detecting defect information that may cause a problem in the source code based on the information that is required for analysis and refined by the syntax analysis function, wherein the defect information is configured with positional information of a line in which a defect is detected;
   a correction example generation function for generating correction example information or notice information or both based on the defect information detected by the defect detection function and the information that is required for analysis and refined by the syntax analysis function and being configured to generate one or more pieces of correction example information or one or more pieces of notice information for single defect information; and
   an analysis result transmission function for constructing synthesized analysis result information including the generated defect information, and the correction example information or the notice information or both, and transmitting the constructed synthesized analysis result information to an analysis result output function, and the analysis result output function includes:
   a defect output function for extracting the defect information from the synthesized analysis result information received from the source code analysis function and outputting the extracted defect information; and
   a correction example output function for extracting the correction example information or the notice information or both from the synthesized analysis result information received from the source code analysis function and outputting the extracted information,
wherein the detection of the defect information by the defect detection function is performed by a functional execution of each checker that is provided so as to check each defect, and each checker transmits the synthesized analysis result information that includes the correction example information or the notice information or both to be generated for the defect information detected while detecting the defect information to the correction example generation function,
wherein the correction example information includes at least one of "adding" another code line for a source code line in which the defect information is detected, "replacing" a source code line in which the defect information is detected with another source code line, and "deleting" a source code line in which the defect information is detected, and
wherein the correction example information includes a correction example code, the correction example code being generated by inputting a deduced result that is obtained by analyzing the source code according to a predetermined template by the checker that has detected the defect information.

* * * * *